US010654231B2

(12) United States Patent
Dowel (10) Patent No.: US 10,654,231 B2
(45) Date of Patent: May 19, 2020

(54) SEALANT COMPOSITION (71) Applicant: Trydel Research Pty Ltd, Ferntree Gully (AU)

(72) Inventor: Terence Dowel, Ferntree Gully (AU)

(73) Assignee: Trydel Research Pty Ltd, Ferntree Gully (AU)

( * ) Notice: Subject to any disclaimer, the term of this patent is extended or adjusted under 35 U.S.C. 154(b) by 0 days.

(21) Appl. No.: 15/773,362

(22) PCT Filed: Nov. 7, 2016

(86) PCT No.: PCT/AU2016/051062
§ 371 (c)(1),
(2) Date: May 3, 2018

(87) PCT Pub. No.: WO2017/075673
PCT Pub. Date: May 11, 2017

(65) Prior Publication Data
US 2018/0304564 A1 Oct. 25, 2018

(30) Foreign Application Priority Data
Nov. 6, 2015 (AU) ................ 2015904569

(51) Int. Cl.
B29C 73/16 (2006.01)
B29C 73/02 (2006.01)
C08K 5/15 (2006.01)
C08L 5/00 (2006.01)
C08K 3/00 (2018.01)
B29L 30/00 (2006.01)

(52) U.S. Cl.
CPC ............ B29C 73/163 (2013.01); B29C 73/02 (2013.01); B29L 2030/00 (2013.01)

(58) Field of Classification Search
None
See application file for complete search history.

(56) References Cited

U.S. PATENT DOCUMENTS 2,986,544 A * 5/1961 Driscoll ................. C09J 131/04
524/524
5,856,376 A * 1/1999 Wong .................... B29C 73/163
152/504
5,916,931 A 6/1999 Adams et al.
(Continued)

FOREIGN PATENT DOCUMENTS

| CN | 103497731 | * | 8/2015 |
| IN | 2391MUM2014 A | | 8/2015 |
| WO | 2015/089754 | | 6/2015 |

OTHER PUBLICATIONS

English abstract of FR 2899595, France, Oct. 12, 2007, 6 pages.*
(Continued)

*Primary Examiner* — Tae H Yoon
(74) *Attorney, Agent, or Firm* — Myers Bigel, P.A.

(57) ABSTRACT

A tire sealant composition is provided for sealing punctures in pneumatic tires, particularly in the extreme outer shoulder edge and sidewall, comprising a liquid carrier, latex in an amount between about 0.5 to about 6.0% by weight of the composition, a polysaccharide suspending agent and a particulate material with a particle size of less than 300 μm. The composition allows for passage through the tire valve without the need for removal of the valve core.

19 Claims, 1 Drawing Sheet

0.1% 'CELLULON PX'
ALL SOLID PARTICLES INCLUDING LATEX REMAIN FULLY SUSPENDED AND EVENLY DISTRIBUTED THROUGHOUT THE TEST

NO CELLULON PX
} FLOATING LATEX
} SOLID PARTICLES SETTLE (56) References Cited

U.S. PATENT DOCUMENTS

| | | | |
|---|---|---|---|
| 8,329,778 B2* | 12/2012 | Dowel | B29C 73/163 |
| | | | 523/166 |
| 9,254,614 B2 | 2/2016 | Takahara | |
| 2005/0277712 A1* | 12/2005 | Daly | B29C 73/163 |
| | | | 524/17 |
| 2006/0111494 A1 | 5/2006 | Cegelski | |
| 2007/0225405 A1 | 9/2007 | Cegelski et al. | |
| 2010/0210501 A1* | 8/2010 | Caggioni | C11D 3/222 |
| | | | 510/338 |
| 2013/0029895 A1* | 1/2013 | Bettiol | C11D 3/1266 |
| | | | 510/236 |

OTHER PUBLICATIONS

English abstract of IN 201402391 I3, India, Aug. 21, 2015, 3 pages.*
International Search Report and Written Opinion, PCT/AU2016/051062, dated Feb. 6, 2017, 9 pages.
Australian Patent Office International-Type Search Report and Written Opinion, AU2015049569, dated Aug. 5, 2016, 9 pages.

* cited by examiner

SEALANT COMPOSITION

CROSS REFERENCE TO RELATED APPLICATIONS

This application is a 35 U.S.C. § 371 national phase of International Application Serial No. PCT/AU2016/051062, filed Nov. 7, 2016, which claims the benefit of Australian patent application serial no. 2015904569, filed Nov. 6, 2015, the disclosure of which is incorporated by reference herein in its entirety.

FIELD OF THE INVENTION

This invention relates to sealant compositions for sealing punctures in pneumatic tires and in particular to particle-based through-the valve core sealant compositions for the temporary sealing of punctures in the extreme outer shoulder edge of pneumatic tires, which sealing effectiveness is controlled to begin to diminish after a certain further distance has been travelled.

BACKGROUND OF THE INVENTION

Any reference to background art herein is not to be construed as an admission that such art constitutes common general knowledge in Australia or elsewhere.

Sealant compositions for pneumatic tires have been developed to provide temporary sealing of pneumatic tires after a puncturing incident has occurred. The sealing of punctured tires with such compositions is a stop gap measure in that it serves the purpose of making the vehicle with the punctured tire drivable again for a limited period of time and/or a limited distance. After that the tire is either to be replaced or, if possible, repaired. Some sealant compositions have been applied prophylactically and become automatically effective the moment damage occurs in the area of the tread of the tire. A disadvantage of this is that the driver of the vehicle with the damaged tire may not be aware the damage to the tire has occurred.

Tire puncture repair kits were developed to conveniently restore vehicle mobility following a puncture event, thereby eliminating the need to carry a spare wheel and associated equipment. This afforded a much quicker, easier and safer means of restoring vehicle mobility as well as saving weight. The kits included a plugin compressor and a canister of latex sealant that could be pumped into the tire without having to remove the valve core. Latex was the only choice initially available and has been used in aerosol sealants for many years. This is because latex was known to have excellent sealing properties including being one of the only adhesive materials that has the ability to bond to itself when it cures.

Latex effectively seals punctures due to a cross linking action caused by the interaction between the latex and the escaping air. The skin forming chemical reaction of latex occurring within the puncture site quickly forms into what would be considered a glued-into-place permanent solid plug. This is contrary to what is the intended outcome as the use of the sealant is meant to be a temporary repair only. Thus, while latex is an ideal material for repairing or sealing punctures, the resultant permanent seal product by the curing of the latex is a major problem. The intended user, the driver of the affected vehicle, is instructed to not exceed 90 km/h and to have the tire checked and repaired or replaced as soon as possible.

Sealant compositions are primarily intended for sealing punctures in the tread area of pneumatic tires. Their effectiveness becomes more problematic when the puncture occurs in the shoulder of the tire. Punctures in side walls of pneumatic tires are not safely sealable, even temporarily, and require urgent replacement of the damaged tire. However, in recent years certain of the original equipment manufacturers (car manufacturers) have escalated their puncture sealing standard to much higher levels. This increased sealing requirement now dictates that a puncture caused by a 6.00 mm diameter spiked object be sealed effectively when the puncture occurs in the extreme outer shoulder edge (virtually in the side wall) and a puncture caused by a 4.00 mm diameter spiked object be sealed effectively when the puncture occurs in the sidewall.

A reliable and effective seal that meets these requirements up to now could only be achieved with a latex formula. Latex is the only sealant that has been accepted to date by the original equipment manufacturers to meet their outer shoulder edge and sidewall sealing requirement. However, latex, due to its permanent sealing capacity, does not permit discrimination between repairable and non-repairable unsafe punctures.

The accepted industry standards require that extreme shoulder edge spiked punctures (i.e. those caused by a spike of 6.00 mm diameter) must pass a 48 hour leak-down test. However, meeting this level of sealing performance contravenes authorised tire repair standards in that permanent repairs are not permitted in the shoulder area or sidewall of a tire. This is due to the high levels of flexing in these regions and the potential risk of structural failure of the reinforced ply cords. Vehicle tires are subjected to extreme flexing and distortion in the outer shoulder edge. Additionally, the tire wall thickness in the outer shoulder edge is less than half that of the tread area, and has far less reinforcement than the tread when one considers the steel belt in the tread. Nevertheless, latex is a close equivalent of a permanent repair. It forms a rubber 'plug' that becomes permanently bonded into the puncture site. Hence there is no visual indication that the integrity of the tire's reinforced structure may have been compromised. Most drivers are unaware of the legal restrictions and assume that because a temporarily repaired tire looks inflated, it is therefore automatically deemed safe. This can be a dangerous assumption. If a major intrusion is being camouflaged due to the high level of sealing performance and resilient characteristics of latex, this can lead to sudden air loss escaping from the region of any weakened and fatigued structure.

Another major issue with a conventional latex based sealant composition is the propensity of latex particles, during long-term storage of the composition, to aggregate near the surface of the composition with the result that the composition becomes creamy in appearance with an upper layer of aggregated latex particles. The aggregated particles can clog the outlet of a tire sealant composition container hindering the passage of the sealant composition out of the container, or in passing through the tire valve, into the tire so that a smooth puncture sealing operation cannot be carried out. The disclosure in WO 2007/112010 attempts to manage this problem by incorporating glycerine, or glycerine and potassium acetate, as anti-freeze agents in place of ethylene glycol or propylene glycol, optionally with surfactants. While glycerine is said to be less easily mixed with latex than ethylene glycol, in combination with a surfactant mixing procedure it is said to suppress the upward migration activity of latex particles and their accumulation near the surface of the composition.

SUMMARY OF THE INVENTION

The present invention is predicated, at least in part, on the surprising finding that it is possible to reliably and responsibly seal punctures that meet with original equipment manufacturers' (car manufacturers) sealing requirements while substantially reducing the level of latex typically used in the industry. Advantageously, this reduction results in better acceptance in tire repair shops due to reduced ammonia stench, less messy clean up and reduced environmental impact.

The present sealing compositions therefore strike a balance such that many of the benefits of latex can be exploited but the previously exhibited draw backs are reduced. The sealing compositions therefore allow for optimal flow characteristics within the tire chamber by control of viscosity thereby improving the sealing of outer shoulder edge and sidewall punctures while at the same time controlling the aggregation of the latex solid particles with a suspending agent to thereby provide for increased stability and storage lifetime and reduced likelihood of blockage of dispensing equipment and the valve core.

The compositions further provide for the use of particulate material of a certain size which, in concert with the latex, will provide for surprisingly effective sealing of puncture holes while, again, reducing the risk of valve core blockage. In fact, such a combination is unique in allowing the composition to be dispensed through a valve core of a pneumatic tire with a greatly reduced risk of blockage thereof by either the latex particles or the sealing particulate material. The prior art is replete with examples of latex or particulate sealing formulations which require removal of the valve core before being dispensed due to the larger particle size and risk of clogging from the latex. The effectiveness of both materials can be obtained with the present 'valve-core-in' compositions with the current drawbacks of prior art formulations substantially alleviated.

It will be understood then, that the sealing compositions of the invention are designed for optimal use in repair of pneumatic tires which require the sealant to be passed through a valve core rather than those which are of a 'valve core out' design. Application of sealant composition through a valve core provides for particular challenges in that effective sealing in the prior art has been equated to the use of particles of up to 10,000 µm in size but such particles cannot be passed through a valve core which will have a valve seat and internal spring which allow only for a clearance between themselves and the internal wall of the various valve core brands of between 300 µm to 500 µm. The sealing of punctures in valve core tires therefore requires a sealant composition which can be effective in dispersing, preventing the settling out and transporting during dispensing of particulate material of a size which will not easily block the valve core passageway. The present sealant compositions exceed the initial sealing performance of latex-only formulations by incorporating this particulate material without the latex-only blockage challenges.

To provide such a sealant composition therefore requires the delicate balancing of many individual factors to achieve optimal viscosity, blend of adhesion and particulate materials, sealing strength and time as well as reduced likelihood of blockages of equipment and settling out of the composition.

It has been found that the use of a polysaccharide suspending agent into a latex-containing sealant composition adds significantly to the long-term stability of the tire sealant composition by inhibiting the upward migration and aggregation of latex particles. The polysaccharide suspending agent allows for the use of low levels of latex in the composition and it has surprisingly been found that this low level is both effective in sealing punctures, in combination with particulate material of a certain size range, and in providing for an optimal viscosity which allows sufficient flow within the tire chamber to access and seal punctures in the outer edge and side wall. Importantly, the sealant compositions of the invention also provide the ability to regulate and control the sealed puncture's longevity. After a certain distance travelled the sealing performance diminishes, due in part to the lower levels of latex within the composition, to indicate to the driver by loss of air pressure, that the tire has not yet been inspected and replaced or repaired by a tire repair professional.

It is therefore possible to meet the original equipment manufacturers' outer shoulder edge and sidewall test requirement without the seal being deemed a permanent repair by combining the benefits of a particle based sealant and the aggressive bonding and memory characteristics of latex.

Finally, it is a distinct advantage in terms of compliance with car manufacturer's requirements and general road safety, that the present compositions provide an effective but temporary seal as the sealing of the puncture is entirely effective initially but will lessen once the tire has travelled beyond a certain distance. This will alert the driver that the tire is indeed compromised and will need to be further repaired or replaced thereby reducing risk of a blowout.

The various features and embodiments of the present invention, referred to in individual sections which follow apply, as appropriate, to other sections, mutatis mutandis. Consequently features specified in one section may be combined with features specified in other sections as appropriate.

Further features and advantages of the present invention will become apparent from the following detailed description.

BRIEF DESCRIPTION OF THE DRAWINGS

In order that the invention may be readily understood and put into practical effect, preferred embodiments will now be described by way of example with reference to the accompanying FIGURES wherein.

DETAILED DESCRIPTION OF THE INVENTION

Unless defined otherwise, all technical and scientific terms used herein have the same meaning as would be commonly understood by those of ordinary skill in the art to which this invention belongs.

All amounts of the sealant composition referred to in % by weight amounts refer to the % by weight of that component with reference to the final sealant composition.

As used herein, the term "polysaccharide suspending agent" refers to a natural polysaccharide (also referred to as a gum) which is produced by microbial fermentation or to a derivative or synthetic analogue thereof which is produced by physical or chemical treatment means.

The polysaccharide suspending agent is one which provides for sufficient suspending properties to avoid latex particle flotation in the composition while, importantly, at the same time maintaining a low viscosity. This provides for a suspending agent which, when it is incorporated into a solution, readily flows but at the same time once shear forces stop it provides excellent suspension and stabilising properties.

In one embodiment, the polysaccharide suspending agent is one which in the aqueous compositions of the invention results in a viscosity of between 30 to 100 cP, preferably 30 to 80 cP, more preferably about 30 to 40 cP.

In certain embodiments, the polysaccharide suspending agent is selected from a polysaccharide resulting from microbial fermentation and/or a microfibrous cellulose.

Suitably, the microbial fermentation is bacterial fermentation.

In a preferred embodiment, the polysaccharide suspending agent is a bacterially-derived polysaccharide i.e. one resulting from bacterial fermentation. It has been found that such polysaccharides have advantageous properties in both preventing the aggregation of solids from the latex in the composition and also in assisting with achieving optimal viscosity.

The term "microfibrous cellulose" or "MFC", as used herein refers to MFC prepared by microbial fermentation or MFC prepared by physically modifying cereal, wood, or cotton-based cellulose fibres. Preferably, the term refers to bacterially-derived microfibrous cellulose.

According to a first aspect of the invention there is provided a sealant composition comprising a liquid carrier, latex in an amount between about 0.5 to about 6.0% by weight of the composition, a polysaccharide suspending agent and a particulate material with a particle size of less than 300 μm.

Suitably, the sealant composition is a tire sealant composition for sealing punctures in pneumatic tires. The sealant composition is particularly for sealing punctures in pneumatic tires in the extreme outer shoulder edge and sidewall of the tires.

The liquid carrier may comprise one or more components selected from water, a glycol and glycerine. Preferably, the liquid carrier is an aqueous liquid carrier.

In preferred embodiments, the liquid carrier comprises one or more of water, propylene glycol, and glycerin.

In certain embodiments, the liquid carrier comprises between about 20% to about 80% by weight water, about 5% to about 50% by weight glycerin and about 5% to about 50% by weight propylene glycol.

Suitably, the liquid carrier comprises between about 30% to about 60% by weight water, about 7% to about 55% by weight glycerin and about 4% to about 35% by weight propylene glycol.

In one embodiment, the composition does not comprise ethylene glycol.

It has been found that a relatively high glycerine content, as a component of the liquid carrier, will assist in transporting the particulate material under pressure through the valve cores of tires.

The latex may be any suitable natural or synthetic latex emulsion/dispersion.

In preferred embodiments, the latex is a natural rubber latex emulsion/dispersion. In certain embodiments, a styrene based latex exhibiting similar bonding characteristics may also be suitable.

In one embodiment, the latex is present in an amount of between about 1.0% to about 6.0% by weight of the composition, between about 1.5% to about 6.0%, about 2.0% to about 6.0%, about 2.5% to about 6.0% or about 3.0% to about 6.0%.

Suitably, the latex is present in an amount of between about 1.0% to about 5.5% by weight of the composition. Such amounts may comprise between about 1.0% to about 5.0%, about 1.0% to about 4.5%, about 1.5% to about 5.5%, about 1.5% to about 5.0%, about 1.5% to about 4.5%, about 2.0% to about 5.5%, about 2.0% to about 5.0%, about 2.0% to about 4.5%, about 2.5% to about 5.5%, about 2.5% to about 5.0%, about 2.5% to about 4.5%, about 3.0% to about 5.5%, about 3.0% to about 5.0%, and about 3.0% to about 4.5%.

The use of the term "about" indicates a possible variance of up to 10% from the recited number.

The polysaccharide suspending agent may be one or more selected from the group consisting of biogums or biopolymers, such as xanthan, gellan, welan, grewia, tragacanth and diutan, microfibrous cellulose, bacterial microfibrous cellulose and cellulose produced by the Acetobacter bacterium.

Bacterially-derived microfibrous cellulose and diutan polysaccharides are particularly preferred.

The polysaccharide suspending agents commercially available under the trade name Cellulon PX (a microfibrous cellulose), diutan gum bio polymer sold under the trade name KELCO-VIS DG and grewia polysaccharide gum as air dried grewia gum (ADGG) are particularly preferred.

In certain embodiments, the polysaccharide suspending agent is not a hydroxyl alkyl cellulose or a carboxy alkyl cellulose.

In embodiments, the polysaccharide suspending agent is present in an amount of between about 0.0025% to about 1.0% by weight of the total composition, between about 0.005% to about 0.5%, about 0.0075% to about 0.1%, about 0.009% to about 0.075% or about 0.01% to about 0.05%. Suitably, the polysaccharide suspending agent is present in an amount of between about 0.01% to about 0.03% by weight of the composition, with about 0.02% being preferred.

It could not have been predicted that such low levels of the polysaccharide suspending agent could be effective in preventing flotation of the latex solids over long storage periods, even with compositions of relatively low viscosity. Microbially-derived polysaccharide suspending agents are believed to be particularly effective in this regard.

In one embodiment, the particulate material has a maximum particle size ranging from about 50 μm to about 300 μm, about 100 μm to about 300 μm, about 150 μm to about 300 μm, about 200 μm to about 300 μm.

It is preferred, however, that the particulate material has a maximum particle size of less than 250 μm. While particle sizes of up to 300 μm may be suitable in certain applications it has been found that over time and at higher temperatures the particles at the upper limit may start to cause issues with blockage of equipment. A maximum particle size of 250 μm, however, constitutes the preferred finely ground particles forming the blocking medium that establishes the seal but has a greatly reduced risk of blockage of equipment. Therefore, in certain embodiments, the maximum particle size of the particulate material is between about 50 μm to about 250 μm, about 100 μm to about 250 μm, about 150 μm to about 250 μm, and about 200 μm to about 250 μm.

It will be understood that the preparation of particulate material will result in a spread of particle sizes and so reference above to a maximum particle size refers to the maximum particle size that forms at least 10% or at least 20% of the particle size spread.

Additionally, the inventor has found that distinct advantages can be achieved in efficiency and reliability of sealing of punctures, particularly in the outer shoulder edge and sidewall of the tire, if the particulate material has a certain characteristic spread of particle size ranges. Therefore, in one embodiment, the particulate material comprises a distribution of particle sizes of (i) about 0.5% to about 5% from about 10 µm to about 38 µm; (ii) about 4% to about 12% from about 38 µm to about 75 µm; (iii) about 35% to about 60% from about 75 µm to about 150 µm; about 20% to about 45% from about 150 µm to about 200 µm; and about 5% to about 18% from about 200 µm to about 250 µm.

In certain embodiments, the particulate material comprises a distribution of particle sizes of (i) about 1.0% to about 4% from about 10 µm to about 38 µm; (ii) about 5% to about 11% from about 38 µm to about 75 µm; (iii) about 40% to about 55% from about 75 µm to about 150 µm; about 25% to about 40% from about 150 µm to about 200 µm; and about 7% to about 15% from about 200 µm to about 250 µm.

In further embodiments, the particulate material comprises a distribution of particle sizes of (i) about 1.5% to about 3% from about 10 µm to about 38 µm; (ii) about 6% to about 10% from about 38 µm to about 75 µm; (iii) about 42% to about 50% from about 75 µm to about 150 µm; about 28% to about 37% from about 150 µm to about 200 µm; and about 9% to about 14% from about 200 µm to about 250 µm.

In one preferred embodiment, the distribution of particle size may be about 2% from about 10 µm to about 38 µm, about 8% from about 38 µm to about 75 µm, about 46% from about 75 µm to about 150 µm, about 33% from about 150 µm to about 200 µm, and about 11% from about 200 µm to about 250 µm.

The nature of the particulate material is not particularly limited and may be selected from one or more of synthetic polymers, plant polymers and clays.

In certain embodiments, the particulate material may be selected from one or more of polyethylene, polypropylene, pulverised bark powder, pulverised peanut shells, chitosan, Equisetum Arvense powder, tea powder, parsley powder, diatomite, bentonite and titanium dioxide.

In particularly preferred embodiments, the particulate material is a polyethylene powder, even more preferably a high density polyethylene powder.

Whatever the nature of the particulate material it is important that the material is ground appropriately and then filtered/sieved to limit the maximum particle size to no more than about 250 µm. The grinding process should also provide for a distribution of particle sizes as discussed above. The high density polyethylene powder, or equivalent, is produced by grinding at ambient temperature. It has been found that the resulting particles have "tails", i.e., elongated portions, which appear to assist in sealing of the puncture in the pneumatic tire.

In one embodiment, the sealant composition of the invention will have a total solids content of between about 3% to about 8%, including about 3% to about 7% and about 3% to about 6%, preferably between about 4% to about 6%, by weight of the total composition.

In certain embodiments, the sealant composition further comprises a component selected from the group consisting of fumed silica, tapioca, ammonia, gum rosin, a silicate such as sodium silicate, sodium bicarbonate, vinyl resin and polybutane or any combination thereof.

These materials can provide a range of advantages, as discussed further herein, including improved grip of sealant, improved air tight sealing for the small solids, and preferred pH and viscosity levels.

In one embodiment, the fumed silica is present in the sealant composition in a range of between about 0.05 to about 2.5%, between about 0.10 to about 2.0%, between about 0.20 to about 1.75%, by weight of the composition.

In certain embodiments, the silicate, such as sodium silicate, is present in the sealant composition in a range of between about 0.03 to about 0.15%, between about 0.04 to about 0.13%, between about 0.05 to about 0.12% by weight of the composition.

In an embodiment, the gum rosin, is present in the sealant composition in a range of between about 0.40 to about 1.50%, between about 0.50 to about 1.20%, between about 0.60 to about 1.0% by weight of the composition.

To meet the sealing performance required by the original equipment manufacturers the present compositions therefore incorporate lesser amounts of latex but require a combination of a low level latex formulation and a non-latex "valve through" particle based formulation, the latter being such as that disclosed in WO 2009/04696 which is herein incorporated by reference in its entirety. This combination provides additional benefits beyond that seen individually with both types of formulations. The particle based aspect prevents the installed sealant from spraying out onto a vehicle's paintwork which can occur with a latex formulation while it is forming a seal. This aspect is also helpful when a puncture happens to be in or around the 6 o'clock foot print position as it prevents sealant from leaking out onto the roadway.

The improved sealant composition according to the invention may also incorporate a surfactant to help create foam within the tire chamber. As the wheel rotates the sealant flow is disturbed by the deflection in the footprint area, thereby continually aerating the sealant to ensure the maximum sealant coverage possible.

Typically, a sealant composition according to the present invention may be injected into a pneumatic tire which has a puncture requiring sealing through the valve using an apparatus such as disclosed in WO 2010/078626 which is herein incorporated by reference in its entirety.

A significant advantage of the invention is the achieving of an effective seal with a substantially particle-based sealant that will satisfy the original equipment manufacturers' requirements and closely match the sealing performance of latex formulations without some of the downsides of latex-only formulations. High levels of latex in latex-only formulations that have up to around sixty percent latex solids are required to achieve an effective seal meeting the aforesaid original equipment manufacturers' requirement. The present compositions mean it is now possible to do the same thing with four to five percent solids, preferably with the actual latex solids being as low as two percent (that is 30 times less than previously used). Another advantage is that the sealant composition of the invention exhibits superior behaviour if and when a puncture caused by a large object occurs and is treated when the puncture is in the 5 to 7 o'clock position. Latex can stream out of such a puncture, squirting out onto the ground, with the risk of the puncture not being sealed before all the sealant is lost.

The initial sealing of a puncture relies on the particulate material, such as ground high density polyethylene particles. While many types of ground particles are effective, e.g., ground plastics, tree bark, peanut shells, chitosan, etc. High density polyethylene is preferred because of its neutral colour, low specific gravity, and the particle shape after grinding which is helpful in rapidly forming a "log jam" that chokes off the puncture quickly.

Sodium silicate, sodium bicarbonate, vinyl resin, fumed silica and other solids, when used, also become compacted inside the puncture wound and are useful in ensuring the established seal is airtight. Latex is known to have excellent properties in relation to provision of the necessary adhesion and elasticity necessary to cope with the high deflection of a tire in the outer shoulder area. With sodium silicate, sodium bicarbonate, gum rosin, and other solids providing the physical grip to help better hold the seal in place, this allows latex within the puncture site sufficient time to cure. The heat generated by the rotating tire and exposure to outside air when driving have been found to provide suitable conditions for the latex to cure quickly and become highly effective.

In laboratory tests, bottles with 4×0.7 mm holes in the cap are pressurised to 7 bar, around three times normal car tire pressure. Under these extreme conditions very little sealant escapes. The test bottles are charged with 75 mls of test sealant composition of the invention (formulation 1, below) with an average of around 10 mls escaping through the holes before the holes become blocked and the seal is established. When the same test is carried out with a latex sealant, all the latex squirts out very rapidly without forming a seal.

It takes a very small miniscule amount of sealant composition of the invention to establish and form a seal. Typically, it only requires a few drops. The cross-sectional area of a car tire puncture, even when it has an air loss rating as high as 4 p.s.i. per minute is still small, due to the resilience and memory of the rubber compound in the tire. A hole caused by a puncturing object that is 6.25 mm in diameter is not itself 6.25 mm in diameter. The puncture closes up to a size that is often difficult to see.

If the puncture is in the crown area of the tread of the tire which is where the sealant provides full coverage of the puncture while driving, even after the latex is exhausted, the sealant will still remain effective. The tire has plenty of structural strength in the crown area and therefore a puncture in the crown area of the tread does not raise the same safety issues as a puncture in the shoulder. With a 6.00 mm diameter spike puncture in the shoulder area of a tire, the tire can slowly begin to lose air after the vehicle has been driven for a distance of around 2000 to 3000 kms, if not repaired or replaced.

As the tire rotates, centrifugal movement causes the remaining unbonded sealant composition to form a stream of liquid that covers the inside surface of the tire chamber, roughly corresponding to the width of the tire's crown area. Due to the deflection in the footprint area of the tire the dynamics of the resulting band of sealant is disturbed, resulting in the otherwise even band of sealant widening ("fish tail") in this area which is around 10 degrees of the tire's full 360 degrees rotation.

Thus, there is a very short period of time, in the order of a millisecond at normal driving speeds, whereby the band of sealant composition widens and then returns back to normal for the rest of the wheel's rotation (350 degrees). It is during that very short period of time that a small amount of latex coats the footprint area on the inside of the tire and slowly builds up a thin film on the inside of the tire. The latex film is exposed to the air within the tire chamber during the rest of its 350 degree travel inside the tire. This cures the latex leading to the forming of a cured latex film on the inside of the tire. This process, which begins as soon as tire rotation commences, only continues while the tire is rotating until long distances have been covered (typically 1500 to 2500 kms) by which time almost all of the latex from the sealant has been deposited in the cured latex film and therefore is exhausted. The sealing performance of the sealant formulation incrementally diminishes as the latex is deposited. It should be noted that some of the other solids in the sealant formulation are also deposited along with the latex in this process. A beneficial aspect of this is that it makes cleaning out the inside of the tire and disposal of the exhausted sealant formulation easier, with reduced environmental impact.

As previously stated, high concentration latex formulations increase the risk of spraying latex over the paint work of a vehicle as the driver drives off. The risk is very significantly reduced when using a sealant composition according to the present invention. Another benefit of the present invention is that due to the low levels of latex and the use of particulate material and optionally other solids in the sealant composition, any residual dried out sealant composition left in hoses and the delivery system of a sealant delivery apparatus, after treatment of a punctured tire, will not be enough to block the hoses and other items of delivery equipment. The same cannot be said for latex formulations. It is impossible to reuse the sealant delivery equipment in the same way as the sealant composition of the present invention. As sealant compositions according to the present invention have a low level of total solids and a correspondingly low level of latex, they permit the designing of compressor kits able to be refilled with replacement sealant compositions without having to replace bottles, hoses and fittings after each use. With high concentration latex formulations, even a small amount of a residual latex in a hose or fitting will dry out and cure irreversibly thereby partially or completely blocking the system. In such circumstances the next time a bottle containing a sealant formulation is inserted into, or screwed into, the compressor kit and the compressor is activated it may be found that the air lines have become blocked or any partially cured latex that breaks free blocks the tire valve after moving down the hose attached to that tire valve.

A comparative test to demonstrate that sealant compositions according to the present invention can be injected repeatedly into tires using the same delivery system (compressor kit) involved the following steps:

1. After each application/injection the compressor kit was placed in an oven at 70° C. for 15 hours;
2. The application/injection/heating routine was repeated 2 or 3 times;
3. The compressor kit was cooled to −10° C. and tested for valve blockage.

It was found that a high concentration latex formulation failed and caused blockage on the first repeat of the routine, while a sealant composition according to the present invention (Example 1 composition) did not cause any discernible blockage even after all the routine had been completed. The commercially available comparator formulations were a Toyota Latex Sealant produced by Terra-S and a Dunlop Tech Sealant.

Additional advantages of sealant compositions according to the present invention include reduction in the amount of ammonia required, with concomitant reduction in stench, rapid puncture sealing (particularly in the challenging outer edge and sidewall regions), controllable puncture sealing performance, substantially longer storage life than high concentration latex formulations (in some instances double the shelf life), reduced environmental impact, and the ability to adjust sealing performance to within safety limits to thereby regulate and control the sealed puncture's longevity (after a certain distance travelled the sealing performance diminishes to indicate to the driver by losing air pressure, that the tire has not yet been inspected and replaced or repaired by a tire repair professional).

Conventional latex formulations, containing up to 60% latex emulsions initially are thin liquids with viscosities similar to that of full cream milk. After 3 to 4 years storage these formulations can thicken to a viscosity similar to that of cream. At this viscosity valve blockage problems arise. Such issues are not likely to occur with sealant compositions according to the present invention. The lower viscosity of the present formulations is maintained both during storage and, indeed, during use in the tire chamber. As discussed, the lower latex levels of the present compositions also makes for a much less messy clean-up and a greatly reduced impact on the environment. There are around 15 million latex sealant bottles that expire each year and these have to be disposed of whereas the present compositions allow for easier wash out and reuse of containers.

In embodiments, the sealant composition comprises a viscosity between about 30 to about 100 centipoise (cP)

In certain embodiments, the sealant composition comprises a viscosity selected from between about 30 to about 90 cP, about 30 to about 80 cP, about 30 to about 70 cP, about 30 to about 60 cP, about 30 to about 50 cP, and preferably about 30 to about 40 cP.

As discussed herein, the viscosity of the compositions is an important factor in their efficacy and it has been found that viscosities much below about 30 cP can cause issues with maintaining suspension of the latex particles while those much about 100 cP will not be of sufficiently low viscosity to move along the tire chamber and effectively seal in the outer edge and sidewall.

The performance requirements at different temperatures dictate the percentage of glycerine and/or propylene glycol present in the sealant composition. Where the operating temperature is to be as low as −30° C., the glycerine and/or propylene glycol content should be in the order of 45% by weight of the final composition (such as 35% to 50%), and at an operating temperature as low as −20° C., it should be from 30% to 35% by weight of the final composition.

It is critical to ensure the latex stays fully suspended as achieved in good part by the polysaccharide suspending agent, especially when a concentrate version of the tire sealant composition is prepared for later dilution into a water/glycerine and/or propylene glycol solution. If the order of addition of components in the manufacturing process described herein is not followed, it has been found that a proportion of the latex may separate out and adhere to the walls of the mixing vessels and to the processing equipment. This creates difficulties in cleaning of the mixing vessels and processing equipment.

When combinations of propylene glycol and glycerine are used as anti-freeze in combination with a latex emulsion, it is known that latex readily floats to the surface in the formulation. As described above, it has been surprisingly found that this phenomenon can be particularly effectively controlled by introducing an efficient low viscosity polysaccharide suspending agent, such as a microfibrous cellulose and/or Diutan Gum or similar biopolymer, at a concentration of about 0.02% by weight of the final composition. The requirements of car manufacturers are that a satisfactory sealant composition can pass through the valve core of a tire in a sufficient amount within a limited time period. For instance, if the sealant temperature is −30° C., the viscosity of the sealant composition must remain low enough to permit a flow rate that will meet the requirements, i.e., equal to or better than 600 ml of sealant composition passing through the valve core within 90 seconds while applying 5 to 6 bar air pressure to the sealant bottle.

It has been found that one can further lower the viscosity of the sealant composition by reducing the percentage of polysaccharide suspending agent, such as Cellulon PX microfibrous cellulose derivative or Kelco+Vis DG Fermented Diutan Gum. The role of a Cellulon PX-type microfibrous cellulose derivate in overcoming the latex flotation phenomena discussed previously can be assisted in part by mixing about 40% sodium silicate into the latex emulsion before it is added to the composition at a ratio of approximately 20 to 30% by weight of 40% sodium silicate to 70% to 80% by weight of latex 60% emulsion. The polysaccharide suspending agent therefore still performs a key role but its levels can be reduced somewhat, if desired, by silicate supplementation.

According to one embodiment of the present invention there is provided a tire sealant composition for sealing punctures in pneumatic tires, particularly in the extreme outer shoulder edge and sidewall, said composition comprising glycerine, propylene glycol, xanthan gum or a microfibrous cellulose derivative (such as that sold under the trade name Cellulon PX or KELCO-VIS DIUTAN GUM Bio Polymer), water, a "concentrate" pre-mix, natural rubber latex (60% emulsion), and a "rosin solution" pre-mix; the "concentrate" pre-mix including glycerine, propylene glycol, water, a non-ionic surfactant (such as that sold under the trade name Axieogreen LA8), fumed silica (such as that sold under the trade name Aerosil R972), tapioca, high density polyethylene powder or similar solid ground material, with particle size range from 10 to 250 μm, bentonite, polybutane, and sodium silicate 40%; and the "rosin solution" pre-mix including gum rosin, propylene glycol, alcohol, and ammonia 20%.

Aerosil R972, a fumed silica, and/or xanthan gum are included to contribute to the optimum suspension of the solid particles. A microfibrous cellulose derivative, such as Cellulon PX or KELCO-VIS DIUTAN GUM Bio Polymer or a grewia gum, may be preferred over xanthan gum as they offer better suspension properties and affect viscosity less deleteriously than xanthan gum. Therefore, in one embodiment, the composition does not comprise xanthan gum as a polysaccharide suspending agent.

The microfibrous cellulose derivatives currently sold under the trade name Cellulon PX and DIUTAN GUM Bio Polymer sold under the trade name KELCO-VIS DG have been found to be very effective. High density polyethylene powder or any similar solid ground up material, with particle size ranging from 10 to 250 μm constitutes the preferred finely ground particulate material forming the blocking medium that establishes the seal. A preferred distribution of particle size in such a composition has been found to be approximately 2% from 10 μm up to 38 μm, approximately 8% from 38 μm to 75 μm, approximately 46% from 75 μm to 150 μm, approximately 33% from 150 μm to 200 μm, and approximately 11% from 200 μm to 250 μm.

In one embodiment, the components of this form of tire sealant composition are present substantially in the following weight amounts (the weights being expressed as a percentage of the weight of the final composition):

Formulation 1

| | |
|---|---|
| Glycerine | 25.0 |
| Propylene Glycol | 26.0 |
| Cellulon PX or KELCO-VIS DG | 0.02 |
| Water | 39.2 |
| Concentrate Pre-Mix | 4.28 |
| Natural Rubber Latex (60% emulsion) | 3.0 |
| Rosin Solution Pre-Mix | 2.5 |

Preferably the components in the "concentrate" pre-mix are present substantially in the following weight amounts (the weights being expressed as a percentage of the weight of the final formulation):

| | |
|---|---|
| Glycerine | 1.05 |
| Propylene Glycol | 1.26 |
| Water | 0.8 |
| Non-Ionic Surfactant (Axieogreen LA8) | 0.30 |
| Fumed Silica (Aerosil R972) | 0.06 |
| Tapioca | 0.07 |
| High Density Polyethylene Powder ≤250 μm | 0.10 |
| Bentonite | 0.09 |
| Polybutane | 0.22 |
| Sodium Silicate 40% | 0.33 |

Preferably, the components in this form of "rosin solution" pre-mix are present substantially in the following weight amounts (the weights being expressed as a percentage of the weight of the final formulation):

| | |
|---|---|
| Gum Rosin | 0.875 |
| Propylene Glycol | 1.15 |
| Alcohol | 0.05 |
| Ammonia 20% | 0.425 |

It is anticipated that the amounts of gum rosin, sodium silicate 40%, tapioca, high density polyethylene powder or the like, non-ionic surfactant, fumed silica, bentonite, and polybutane preferably can be varied up or down by as much as 300%, although it may be possible to vary the amounts of some components by up to 500%. It is also anticipated that the natural rubber latex (60% emulsion) may constitute between 0.5% and 6% by weight of the final formulation. Variation in the amount of microfibrous cellulose derivate (Cellulon PX or KELCO-VIS DG) is partially constrained by cost, but 0.02% by weight of the final formulation has been found to be very effective.

According to a second aspect of the invention there is provided a method of formulating a sealant composition including the steps of:

(a) preparing a concentrate pre-mix by combining two or more of glycerine, propylene glycol and water and adding a particulate material with a particle size of less than 300 μm and a surfactant;

(b) preparing a rosin pre-mix by combining a liquid carrier with gum rosin;

(c) adding a polysaccharide suspending agent to a liquid carrier and subsequently combining in the concentrate pre-mix, the rosin pre-mix and latex in an amount between about 0.5 to about 6.0% by weight of the composition, with mixing, to thereby formulate the sealant composition.

Suitably, the concentrate pre-mix comprises glycerine, propylene glycol and water.

In one embodiment, the surfactant is a non-ionic surfactant.

In embodiments, the preparation of the concentrate pre-mix may include the further addition of one or more of fumed silica, tapioca, bentonite, polybutane, and sodium silicate.

It is preferred that the particulate material is high density polyethylene powder with the particle sizes ranging from 10 μm up to 250 μm.

In embodiments, the rosin pre-mix is prepared by combining propylene glycol with gum rosin with agitation.

One or more of alcohol and ammonia may be added to the rosin pre-mix.

The liquid carrier to which the polysaccharide suspending agent may be added may be glycerine. To this may be added propylene glycol and/or water.

Once the various components are all combined to form the composition then it may be subjected to a high shear operation.

The sealant composition may be as described for any embodiment of the first aspect.

In one preferred embodiment, the "concentrate" pre-mix is prepared at ambient temperature (i.e., between 5° C. and 30° C.) by adding glycerine, propylene glycol and water in that order to a vessel provided with stirring means, the addition being effected with slow to moderate stirring occurring. Then with slow to moderate stirring continuing the other components are added in the following order: non-ionic surfactant (AXIEOGREEN LA8), fumed silica (Aerosil R972), tapioca, high density polyethylene powder 250 μm (the particle sizes ranging preferably from 10 μm up to 250 μm), bentonite, polybutane, and sodium silicate 40%. The resulting mixture is stirred using a high shear mixer for a period of time, preferably one hour, to allow the pre-mix to achieve a satisfactory degree of mixing.

Preferably, the rosin pre-mix is prepared by adding propylene glycol to gum rosin in a separate vessel provided with heating means and stirring means, for example, a steam-jacketed vessel. Preferably, at this stage the mixture is heated without stirring until it is molten, which is, preferably, at about 95° C. The mixture is then stirred at a slow to moderate rate for several hours, preferably overnight, to ensure that the gum rosin is completely dissolved in the propylene glycol. The resulting solution is allowed to cool to 50° C. and the alcohol and ammonia 20% are added to the resulting solution in that order with moderate stirring until homogeneity is obtained. The stirring is then continued at a slow rate for approximately one hour. The resulting rosin pre-mix can then be decanted into sealed storage containers such as 1 tonne International Bulk Containers (IBCs).

The tire sealant composition is prepared at ambient temperature (i.e., between 5° C. and 30° C.) by adding glycerine to a vessel provided with stirring means. Then, added in the following order, with slow to moderate stirring, are propylene glycol, the polysaccharide suspending agent (such as Diutan Gum Bio Polymer), water, the "concentrate" pre-mix, natural rubber latex, and the rosin pre-mix. The final formulation is passed through high shear pump/mixer to optimize the yield stress and suspension properties of the polysaccharide suspending agent (such as the Diutan Gum Bio Polymer) and thereby prevent latex migrating to the surface of the liquid formulation. The final formulation is poured into sealable containers from which air is expelled or purged.

This particular embodiment of the present invention enables the production of 10 to 1 concentrates which are advantageously suitable for overseas shipment, by incurring lower freight costs and providing improved security.

According to another embodiment of the present invention there is provided a tire sealant composition for sealing punctures in pneumatic tires, particularly in the extreme outer shoulder edge and side wall, said composition including glycerine, water, a "concentrate" pre-mix, a "latex" pre-mix, and a "rosin solution" pre-mix; the "concentrate" pre-mix including propylene glycol, glycerine, water, a non-ionic surfactant (such as that sold under the trade name AXIEOGREEN LA8), a fumed silica (such as that sold under the trade name Aerosil R972), tapioca, high density polyethylene powder or similar material, with particle size range from 10 to 250 μm, a polysaccharide suspending agent/microfibrous cellulose derivative (such as that sold under the trade name Cellulon PX or Fermented Diutan Gum—such as that sold under the trade name KELCO-VIS DG), bentonite, polybutane, and sodium silicate 40%; the "latex" pre-mix including water, an non-ionic surfactant (such as that sold under the trade name AXIEOGREEN LA8), sodium silicate 40%, and latex 60% emulsion; and the "rosin solution" pre-mix including gum rosin, propylene glycol, glycerine, alcohol and ammonia 20%.

Preferably, the components of this embodiment are present substantially in the following weight amounts (the weights being expressed as a percentage of the final formulation):

| | |
|---|---|
| Glycerine | 8.33 |
| Water | 40.0 |
| Concentrate Pre-Mix | 4.30 |
| Latex Pre-Mix | 9.05 |
| Rosin Solution Pre-Mix | 38.32 |

Preferably, the components in the "concentrate" pre-mix are present substantially in the following weight amounts (the weights being expressed as a percentage of the weight of the final formulation):

| | |
|---|---|
| Glycerine | 1.31 |
| Propylene Glycol | 0.90 |
| Water | 0.65 |
| Non-Ionic Surfactant (AXIEOGREEN LA8) | 0.35 |
| Aerosil R972 | 0.07 |
| Tapioca | 0.05 |
| High Density Polyethylene Powder ≤250 μm | 0.15 |
| Cellulon PX/KELCO-VIS DG | 0.01 |
| Bentonite | 0.05 |
| Polybutane | 0.21 |
| Sodium Silicate 40% | 0.55 |

Preferably, the components in the "latex" pre-mix are present substantially in the following weight amounts (the weights being expressed as a percentage as the final formulation):

| | |
|---|---|
| Water | 3.3 |
| Non-Ionic Surfactant (AXIEOGREEN LA8) | 0.35 |
| Sodium Silicate 40% | 0.90 |
| Latex (60% Emulsion) | 4.5 |

Preferably, the components in this form of "rosin solution" pre-mix are present substantially in the following weight amounts (the weights being expressed as a percentage of the weight of the final formulation):

| | |
|---|---|
| Gum Rosin | 0.9 |
| Propylene Glycol | 28.27 |
| Glycerine | 8.17 |
| Alcohol | 0.08 |
| Ammonia 20% | 0.90 |

It is anticipated the amounts of gum rosin, sodium silicate 40%, tapioca, high-density polyethylene powder, non-ionic surfactant, fumed silica, bentonite, and polybutane, preferably can be varied up or down by as much as 200%, although it may be possible to vary the amounts of some components by up to 500%. It is also anticipated that the natural rubber latex (60% emulsion) may constitute between 0.5% and 6% by weight of the final formulation. As previously advised variation in the amount of microfibrous cellulose derivative (Cellulon PX or Fermented Diutan Gum (KELCO-VIS DG)) may be somewhat constrained by cost, but 0.01% by weight of the final composition has been found to be effective.

Preferably, the "concentrate" pre-mix is prepared at ambient temperature (i.e., between 5° C. and 30° C.) by adding glycerine, propylene glycol and water in that order to a vessel provided with stirring means, the addition being effected with slow to moderate stirring. Then with moderate stirring continuing the other components are added in the following order: non-ionic surfactant (e.g., AXIEOGREEN LA8), fumed silica (e.g., Aerosil R972), tapioca, KELCO-VIS DG Fermented Diutan Gum, high density polyethylene powder 250 μm (the particle sizes ranging preferably from 10 μm up to 250 μm), bentonite, polybutane, and sodium silicate 40%. The resulting mixture is stirred using a high shear mixer for a period of time, preferably one hour, to allow the pre-mix to achieve a satisfactory degree of mixing.

Preferably, the "latex" pre-mix is prepared in a separate vessel provided with stirring means. Water is added to the vessel first. Then with moderate stirring occurring the other components of the pre-mix are added in the following order: non-ionic surfactant, sodium silicate 40%, and latex 60% emulsion. Stirring is continued until a homogenous mixture is attained.

Preferably, the "rosin" pre-mix is prepared by adding propylene glycol to gum rosin in a separate vessel provided with heating means and stirring means, for example, a steam-jacketed vessel. Preferably, at this stage the mixture is heated without stirring until it is molten, which is, preferably, at about 95° C. The mixture is then stirred at a slow to moderate rate for several hours, preferably overnight, to ensure that the gum rosin is completely dissolved in the propylene glycol. The resulting solution is allowed to cool to 50° C. and the glycerine, alcohol and ammonia 20% are added to the resulting solution in that order with moderate stirring until homogeneity is obtained. The stirring is then continued at a slow rate for approximately one hour. The resulting rosin pre-mix can then be decanted into sealed storage containers such as 1 tonne International Bulk Containers (IBCs).

The tire sealant composition according to this embodiment of the present invention may be advantageously prepared at ambient temperature (i.e., between 5° C. and 30° C.) by adding glycerine and water to a vessel provided with stirring means. Then added in the following order, with slow to moderate stirring, are the "concentrate" pre-mix, the "latex" pre-mix, and the "rosin" pre-mix. The final formulation is passed through high shear pump/mixer to optimize the yield stress and suspension properties of the microfibrous cellulose derivative and Aerosil 972 and thereby prevent latex migrating to the surface of the liquid formulation. The final composition is poured into sealable containers from which air is expelled or purged.

In yet another even more preferred tire sealant composition, the components are present substantially in the following weight amounts (the weights being expressed as a percentage of the final formulation):

| | |
|---|---|
| Water | 51.7 |
| Sodium Bicarbonate | 0.51 |
| Glycerine | 10.0 |

-continued

| | |
|---|---|
| Cellulon PX or Kelco-Vis DG | 0.02 |
| Non-ionic Surfactant (AXIEOGREEN LA8) | 0.50 |
| Propylene glycol | 10.0 |
| Bentonite | 0.20 |
| Sodium Silicate 40% | 0.80 |
| Concentrate Pre-mix | 2.87 |
| Latex (60% Emulsion) | 4.00 |
| Rosin Solution Pre-Mix | 19.40 |

Preferably, the components in the "concentrate" pre-mix are present substantially in the following weight amounts (the weights being expressed as a percentage of the weight of the final formulation):

| | |
|---|---|
| Glycerine | 1.01 |
| Propylene Glycol | 0.67 |
| Water | 0.67 |
| Non-Ionic Surfactant (AXIEOGREEN LA8) | 0.02 |
| Fumed Silica (Aerosil R972) | 0.113 |
| Tapioca | 0.02 |
| High Density Polyethylene Powder ≤250 μm | 0.07 |
| Vicose Flock Powder | 0.007 |
| Bentonite | 0.02 |
| Polybutane | 0.07 |
| Sodium Silicate 40% | 0.2 |

The components in the "rosin" pre-mix prior to dilution to form the "rosin solution" pre-mix are present substantially in the following weight ratio (the weights being expressed as a percentage of the weight of the final formulation):

| | |
|---|---|
| Gum Rosin | 0.72 |
| Propylene Glycol | 1.22 |
| Alcohol | 0.02 |
| Ammonium 20% | 0.35 |

Preferably, the components in this form of "rosin solution" pre-mix are present substantially in the following weight ratio (the weights being expressed as a percentage of the weight of the final formulation):

| | |
|---|---|
| Propylene Glycol | 8.75 |
| Rosin Pre-Mix | 2.31 |
| Glycerine | 8.34 |

In this embodiment it is not necessary to pre-treat the latex 60% emulsion with sodium silicate 40% and bentonite. However, it is important to subject the bentonite to severe high shear mixing for a period of time sufficient to produce suitably finely ground bentonite as the commercially available bentonite is not always finely ground enough to produce satisfactory results when used in preparation of this embodiment of tire sealant composition. It is anticipated the amounts of gum rosin, sodium silicate 40%, tapioca, high-density polyethylene powder, non-ionic surfactant, fumed silica, bentonite, and polybutane, preferably can be varied up or down by as much as 250%, although it may be possible to vary the amounts of some components by up to 500%. It is also anticipated that the natural rubber latex (60% emulsion) may constitute between 0.5% and 6% by weight of the final formulation. The order of addition of components making up the formulation is important.

Preferably, the "concentrate" pre-mix is prepared at ambient temperature (i.e., between 5° C. and 30° C.) by adding glycerine, propylene glycol and water in that order to a vessel provided with stirring means, the addition being effected with slow to moderate stirring. Then with slow to moderate stirring continuing, the other components are added in the following order: non-ionic surfactant (e.g., AXIEOGREEN LA8), fumed silica (e.g., Aerosil R972), tapioca, high density polyethylene powder or similar material ≤250 μm (the particle sizes ranging preferably from 10 μm up to 250 μm), viscose flock fine powder, bentonite, polybutane, and sodium silicate 40%. The resulting mixture is stirred using a high shear mixer for a period of time, preferably one hour, to allow the pre-mix to realise the yield stress and suspension properties of the Aerosol R972 and Kelco-Vis DG to prevent latex migrating to the surface of the liquid formulation.

Preferably, the "rosin" pre-mix is prepared by adding gum rosin to propylene glycol in a separate vessel provided with heating means and stirring means, for example, a steam-jacketed vessel. Preferably, at this stage the mixture is heated without stirring until it is molten, which is, preferably, at about 95° C. The mixture is then stirred at a slow to moderate rate for several hours, preferably overnight, to ensure that the gum rosin is completely dissolved in the propylene glycol. The resulting solution is allowed to cool to 50° C. and the glycerine, alcohol and ammonia 20% are added to the resulting solution in that order with moderate stirring until homogeneity is obtained. The stirring is then continued at a slow rate for approximately one hour. The resulting rosin pre-mix can then be decanted into sealed storage containers such as 1 tonne International Bulk Containers (IBCs).

The "rosin solution" pre-mix is prepared by adding the "rosin" pre-mix to propylene glycol in a separate vessel provided with stirring means, the addition being carried out with slow to moderate stirring. Then the glycerine is added and stirring is continued until a solution is attained.

The tire sealant composition according to this aspect of the present invention is prepared at ambient temperature (i.e., between 5° C. and 30° C.) by adding water, then sodium bicarbonate, and then glycerine to a vessel provided with stirring means. Then added in the following order, with moderate stirring, are CELLULON PX OR KELCO-VIS DG, non-ionic surfactant (e.g. AXIEOGREEN LA8), propylene glycol, the concentrate" pre-mix, finely ground bentonite, sodium silicate 40%, latex 60^ emulsion, and the "rosin solution" pre-mix. The final composition, preferably, is passed through high shear pump/mixer to optimize yield stress and suspension properties of the formulation and thereby prevent latex migrating to the surface of the liquid formulation.

Preferably, the pH of the sealant composition of the first aspect is between about 8.0 to about 11.0, preferably about 8.5 to about 10.5, more preferably about 9.0 to about 10.0. It has been found that good results are obtained if the pH of the composition is kept higher than 9.3, but preferably below pH 10.0.

Buffering with a bicarbonate salt can be used (e.g., 0.2-1.0 wt % of the final formulation). It appears that this pH adjustment of the sodium silicate 40% to around pH9.6-9.9, and possibly even as low as pH9.3, with the buffering agent generates a form of complexing/miniscule crystallisation effect in the sodium silicate 40%. This process assists in achieving a homogenous and stable suspension. Even though there is an effect on the rheology that borders on it becoming slightly thixotropic, the viscosity can be kept within the limits of the desired range to retain acceptable flow characteristics, e.g., between 40 and 100 cps. This can also be affected by the percentage of glycerine present.

With conventional high concentration latex sealants it is not possible to reuse the same hose and fittings for repeat applications. Latex, within a short time, will coagulate and form a skin and consequently immediately block the valve core on the second or third attempt. Due to the humectant properties of glycerine and the low percentage of the latex finely dispersed within the present composition, exposure to air within hose and fittings has little effect on the sealant. The finely dispersed latex is mostly protected from exposure to air and any coagulation that may occur is minor. Ageing tests have demonstrated that repeated use of the same compressor and the same hose and fittings do not result in valve core blockage.

Another advantage of sealant compositions of the present invention over standard latex formulations is that, unlike high concentration latex formulation sealants, one has the capacity to adjust various ratios of certain active ingredients that perform different functions. With high concentration latex formulations it is 'all or nothing'—when a high concentration latex formulation seals a puncture the seal becomes a long term permanent seal. All sealant kits are supplied with a warning sticker reading "Do Not Exceed 80/90 km/h and have the tire inspected and repaired or replaced without delay" or similar wording designed to be placed and adhered to the speedometer console or steering wheel and to be clearly visible to the driver.

It is of concern that some drivers may not heed these instructions, or can in fact even forget about them all together, or the same vehicles are driven by different and unwitting drivers. In reality there is also the distinct possibility that certain drivers could adopt the complacent mentality "If It's Not Broken Don't Fix It". The sealant compositions of the present invention provide an answer to the above dilemma. If and when a vehicle happens to be driven for an extended distance (such as 2000 to 3000 kms) without the tire being repaired or replaced, there will be a gradual transfer of latex content from the unbonded sealant solution to the inside of the tire where it becomes cured and bonded to the inside surface of the tire. This process brings about a gradual diminishing of shoulder edge sealing performance to the point whereby a puncture in that part of the tire by a 6.00 mm diameter spiked object will provide a warning signal because the tire will begin to lose air after travelling beyond a certain distance, such as 2000 or 3000 kms. This will ultimately force any complacent driver, through the inconvenience of having to continually to add air to the tire, to have the tire repaired or replaced. The present compositions thus provide a highly effective seal but one which is advantageously temporary in nature.

In a third aspect, the invention provides for a method of sealing a puncture in a pneumatic tire including the step of exposing the puncture to a sealant composition comprising a liquid carrier, latex in an amount between about 0.5 to about 6.0% by weight of the composition, a polysaccharide suspending agent and a particulate material with a particle size of less than 300 µm, to thereby seal the puncture.

The sealant composition may be substantially as described in any one or more embodiments of the first and second aspects of the invention.

Preferably, the puncture is in the outer shoulder edge and/or sidewall of the tire. The present compositions advantageously allow for the sealing of such punctures.

The exposure may occur by transfer of the sealant composition from a container through a valve of the pneumatic tire.

The valve of the pneumatic tire will comprise a valve core forming an internal passage with the inner walls of the valve stem.

Preferably, the internal passage, through which the sealant composition will pass, provides for a clearance of between 300 µm to 600 µm, preferably 300 µm to 500 µm.

EXAMPLES

In addition to the embodiments of the inventive composition described above, the following sealant composition is a preferred embodiment.

Example 1

In this preferred embodiment, the components of this form of tire sealant composition are present substantially in the following weight amounts (the weights being expressed as a percentage of the weight of the final formulation):

| | |
|---|---|
| Glycerine | 20.0 |
| Propylene Glycol | 25.0 |
| Cellulon PX or KELCO-VIS DG | 0.02 |
| Water | 44.48 |
| Concentrate Pre-Mix | 5.0 |
| Natural Rubber Latex (60% emulsion) | 3.5 |
| Rosin Solution Pre-Mix | 2.0 |

The components in the "concentrate" pre-mix are present substantially in the following weight amounts (the weights being expressed as a percentage of the weight of the final formulation):

| | |
|---|---|
| Glycerine | 1.0 |
| Propylene Glycol | 1.0 |
| Water | 0.5 |
| Sodium Bicarbonate | 0.21 |
| Non-Ionic Surfactant (AXIEOGREEN LA8) | 0.65 |
| Ammonia 20% | 0.3 |
| Sodium silicate 40% | 0.84 |
| Aerosil R972 | 0.07 |
| Tapioca | 0.06 |
| High Density Polyethylene Powder ≤250 µm | 0.12 |
| Bentonite | 0.06 |
| Polybutane | 0.19 |

The components in this form of rosin solution pre-mix are present substantially in the following weight amounts (the weights being expressed as a percentage of the weight of the final formulation):

| | |
|---|---|
| Gum Rosin | 0.7 |
| Propylene Glycol | 0.92 |
| Alcohol | 0.04 |
| Ammonia 20% | 0.34 |

The "concentrate" pre-mix is prepared at ambient temperature (i.e., between 5° C. and 30° C.) by adding glycerine, propylene glycol and water in that order to a vessel provided with stirring means, the additional being effected with slow to moderate stirring occurring. Then moderate to fast stirring continuing the other components are added in the following order: Sodium Bicarbonate, non-ionic surfactant (AXIEOGREEN LA8), Ammonia 20%, Sodium Silicate 40%, fumed silica (Aerosil R972), tapioca, high density polyethylene powder or similar particulate 250 µm (with approximately 2% of the particles ranging in size from 10 µm to 38 µm, approximately 8% from 38 µm to 75 µm, approximately 46% from 75 µm to 150 µm, approximately 33% from 150 µm to 200 µm, and approximately 11% from 200 µm to 250 µm), bentonite and polybutane. The resulting mixture is stirred for a period of time, preferably one hour, to allow the pre-mix to achieve a satisfactory degree of mixing. It is then processed through a high shear mixer/pump.

The rosin pre-mix is prepared by adding propylene glycol to gum rosin in a separate vessel provided with heating means and stirring means, for example, a steam-jacketed vessel. Preferably, at this stage the mixture is heated without stirring until it is molten, which is, preferably, at about 95° C. The mixture is then stirred at a slow to moderate rate for several hours, preferably overnight, to ensure that the gum rosin is completely dissolved in the propylene glycol. The resulting solution is allowed to cool to 50° C. and the alcohol and ammonia 20% are added to the resulting solution in that order with moderate stirring until homogeneity is obtained. The stirring is then continued at a slow rate for approximately one hour. The resulting rosin pre-mix can then be decanted into sealed storage containers such as 1 tonne International Bulk Containers (IBCs).

The tire sealant composition is prepared at ambient temperature (i.e., between 5° C. and 30° C.) by adding glycerine to a vessel provided with stirring means. Then added in the following order, with slow to moderate stirring, are propylene glycol, the microfibrous cellulose derivative or fermented Diutan Gum, water, the "concentrate" pre-mix, natural rubber latex, and the rosin pre-mix. The final formulation is passed through high shear pump/mixer to operate the yield stress and suspension properties of the microfibrous cellulose derivative, such as Fermented Diutan Gum sold under the trade name KELCO-VIS DG, and thereby prevent latex migrating to the surface of the liquid formulation. The final composition is poured into sealable containers from which air is expelled or purged.

Figure 1:
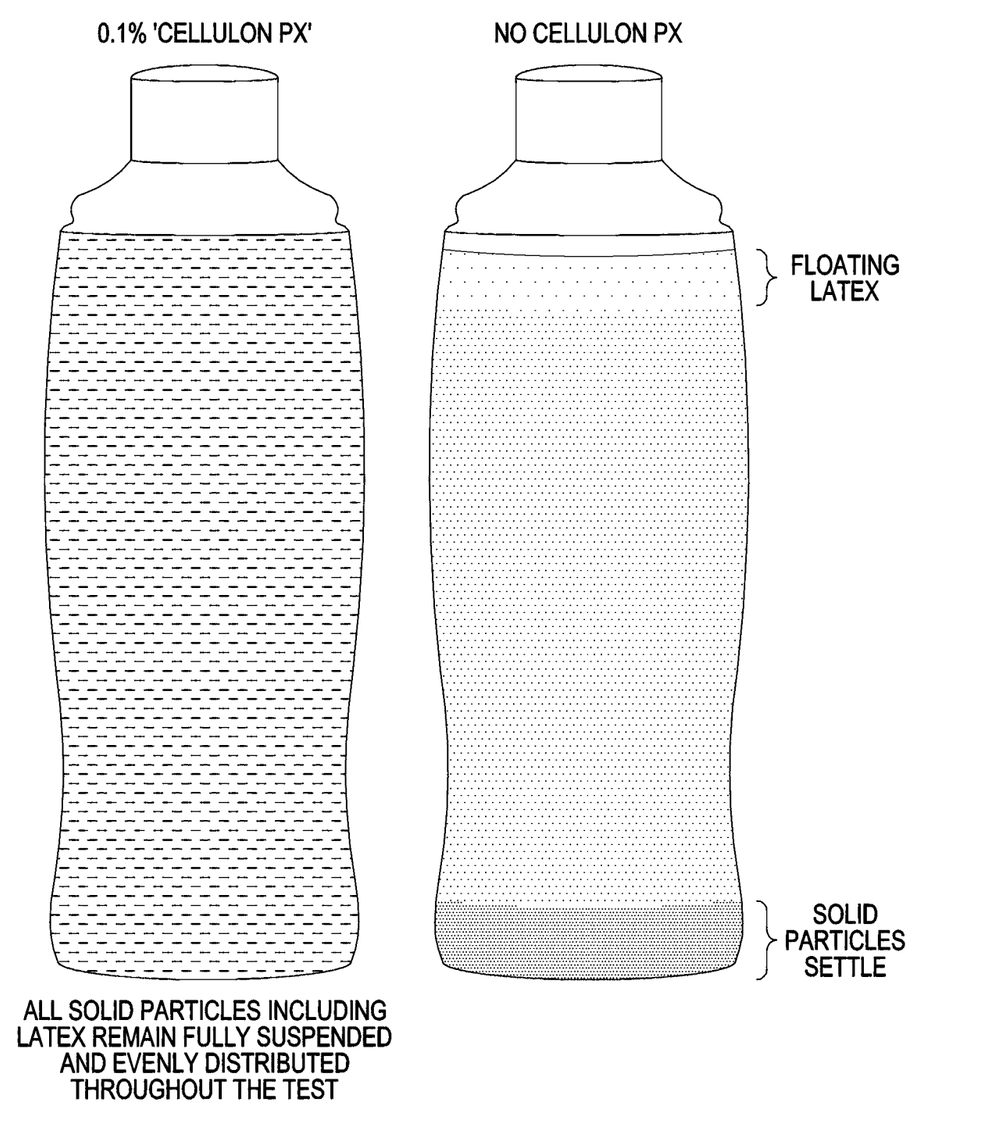
FIG. 1 is a photograph of tire sealant compositions prepared without and with Cellulon PX, as a polysaccharide suspending agent.

The above composition was prepared using Cellulon PX (although at a 1.0% by weight of the total composition level) and an otherwise similar composition prepared but without the use of Cellulon PX. After a period of time the latex particles can clearly be seen to have agglomerated at the surface of the composition whereas with the composition of the present invention using Cellulon PX as a suspending agent, even at a relatively low level of 0.1% by weight, it is apparent that the latex particles are well suspended.

Prepared in much the same manner as just described is the composition of Example 2, below. This example uses the superior suspension properties of the microfibrous cellulose (MCF) 'Cellulon PX' manufactured by C.P. Kelco to prevent the agglomeration of small latex particles on the surface of the composition. While Cellulon PX is employed it will be appreciated that it can be replaced with similar MCFs.

A pre-mix (Part A) of water and glycerine are prepared with Cellulon PX added in descending order. It is then passed through a high sheer mixer to optimise its suspension performance.

Example 2 Composition

| PART A | |
|---|---|
| | % |
| WATER | 40 |
| GLYCERINE | 6 |
| CELLULON PX | 0.1 |

The following ingredients (Part B) are added in descending order while stirring

| PART B | |
|---|---|
| WATER | 18 |
| SODIUM SILICATE 40% | 0.5 |
| PROPYLENE GLYCOL &/OR GLYCERINE | 25 |
| LATEX EMULSION | 3 |
| SEALANT CONCENTRATE (C) | 6.7 |
| PRESERVATIVE | 0.7 |

Part B is added to part A while stirring to form the finished product.

| SEALANT CONCENTRATE (C) | |
|---|---|
| WATER | 1.24 |
| SODIUM BICARBONATE | 0.1 |
| SODIUM SILICATE 40%/Fumed silica | 0.5 |
| PROPYLENE GLYCOL | 1.0 |
| TAPIOCA | 0.5 |
| POLYACRYLATE PRE-MIX | 0.2 |
| ROSIN PRE-MIX | 2.3 |
| POLYETHYLENE POWDER ≤250 µm | 0.06 |
| VINYL ACETATE CO-POLYMER | 0.8 |

The above description of various embodiments of the present invention is provided for purposes of description to one of ordinary skill in the related art. It is not intended to be exhaustive or to limit the invention to a single disclosed embodiment. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

In the claims which follow and in the preceding description of the invention, except where the context clearly requires otherwise due to express language or necessary implication, the word "comprise", or variations thereof including "comprises" or "comprising", is used in an inclusive sense, that is, to specify the presence of the stated integers but without precluding the presence or addition of further integers in one or more embodiments of the invention.

The invention claimed is:

1. A sealant composition comprising a liquid carrier, latex in an amount between about 0.5 to about 6.0% by weight of the composition, a polysaccharide suspending agent and a particulate material with a particle size of less than 300 µm, wherein the polysaccharide suspending agent is not xanthan gum and wherein the particulate material comprises a distribution of particle sizes of (i) about 0.5% to about 5% from about 10 µM to about 38 µm; (ii) about 4% to about 12% from about 38 µm to about 75 µm; (iii) about 35% to about 60% from about 75 µm to about 150 µm; (iv) about 20% to about 45% from about 150 µm to about 200 µm; and (v) about 5% to about 18% from about 200 µm to about 250 µm.

2. The sealant composition of claim 1 wherein the liquid carrier comprises one or more components selected from water, a glycol and glycerine.

3. The sealant composition of claim 2 wherein the liquid carrier comprises between about 20% to about 80% by weight water, about 5% to about 50% by weight glycerin and about 5% to about 50% by weight propylene glycol.

4. The sealant composition of claim 1 wherein the latex is a natural or synthetic rubber latex emulsion or dispersion.

5. The sealant composition of claim 1 wherein the polysaccharide suspending agent is a microbially-derived polysaccharide.

6. The sealant composition of claim 5 wherein the microbially-derived polysaccharide is a product of bacterial fermentation.

7. The sealant composition of claim 1 wherein the polysaccharide suspending agent is present in an amount of between about 0.0025% to about 1.0% by weight of the total composition.

8. The sealant composition of claim 1 wherein the particulate material is selected from one or more of synthetic polymers, plant polymers and clays.

9. The sealant composition of claim 1 wherein the particulate material is selected from one or more of polyethylene, polypropylene, pulverised bark powder, pulverised peanut shells, chitosan, Equisetum Arvense powder, tea powder, parsley powder, diatomite, bentonite and titanium dioxide.

10. The sealant composition of claim 1 wherein the sealant composition has a total solids content of between about 3% to about 6%, by weight of the total composition.

11. The sealant composition of claim 1 further comprising a component selected from the group consisting of fumed silica, tapioca, ammonia, gum rosin, sodium silicate, sodium bicarbonate, vinyl resin and polybutane and combinations thereof.

12. The sealant composition of claim 1 wherein the pH of the sealant composition is between about 9.0 to about 10.0.

13. A method of formulating a sealant composition including the steps of:
   (a) preparing a concentrate pre-mix by combining two or more of glycerine, propylene glycol and water and adding a particulate material with a particle size of less than 300 μm and a surfactant, wherein the particulate material comprises a distribution of particle sizes of (i) about 0.5% to about 5% from about 10 μm to about 38 μm; (ii) about 4% to about 12% from about 38 μm to about 75 μm; (iii) about 35% to about 60% from about 75 μm to about 150 μm; (iv) about 20% to about 45% from about 150 μm to about 200 μm; and (v) about 5% to about 18% from about 200 μm to about 250 μm;
   (b) preparing a rosin pre-mix by combining a liquid carrier with gum rosin;
   (c) adding a polysaccharide suspending agent to a liquid carrier, wherein the polysaccharide suspending agent is not xanthan gum; and then
   (d) combining the liquid carrier with the polysaccharide suspending agent with the concentrate pre-mix, the rosin pre-mix and latex in an amount between about 0.5 to about 6.0% by weight of the composition, with mixing,
   to thereby formulate the sealant composition.

14. The method of claim 13 wherein the concentrate pre-mix comprises glycerine, propylene glycol and water.

15. The method of claim 13 wherein the preparation of the concentrate pre-mix includes the further addition of one or more of fumed silica, tapioca, bentonite, polybutane, and sodium silicate.

16. A method of sealing a puncture in a pneumatic tire comprising a step of exposing the puncture to a sealant composition of claim 1, to thereby seal the puncture.

17. The method of claim 16 wherein the puncture is in the outer shoulder edge and/or sidewall of the tire.

18. The method of claim 16 wherein exposure occurs by transfer of the sealant composition from a container through a valve of the pneumatic tire without removal of the valve core as a necessity.

19. A sealant composition comprising a liquid carrier, latex in an amount between about 0.5% to about 6.0% by weight of the composition, a polysaccharide suspending agent selected from diutan gum and grewia gum in an amount of between about 0.0025% to about 1.0% by weight of the composition, and a particulate material with a particle size of less than 300 μm, wherein the particulate material comprises a distribution of particle sizes of (i) about 0.5% to about 5% from about 10 μm to about 38 μm; (ii) about 4% to about 12% from about 38 μm to about 75 μm; (iii) about 35% to about 60% from about 75 μm to about 150 μm; (iv) about 20% to about 45% from about 150 μm to about 200 μm; and (v) about 5% to about 18% from about 200 μm to about 250 μm.

* * * * *

UNITED STATES PATENT AND TRADEMARK OFFICE
CERTIFICATE OF CORRECTION

| | | |
|---|---|---|
| PATENT NO. | : 10,654,231 B2 | Page 1 of 1 |
| APPLICATION NO. | : 15/773362 | |
| DATED | : May 19, 2020 | |
| INVENTOR(S) | : Terence Dowel | |

It is certified that error appears in the above-identified patent and that said Letters Patent is hereby corrected as shown below:

In the Specification

Column 14, Line 19: Please correct "powder 250" to read -- powder $\leq$ 250 --

Column 16, Line 18: Please correct "powder 250" to read -- powder $\leq$ 250 --

Column 20, Line 64: Please correct "particulate 250" to read -- particulate $\leq$ 250 --

In the Claims

Column 22, Line 58, Claim 1: Please correct "10 μM" to read -- 10 μm --

Signed and Sealed this
Twenty-seventh Day of October, 2020

Andrei Iancu
*Director of the United States Patent and Trademark Office*